Figure 1:
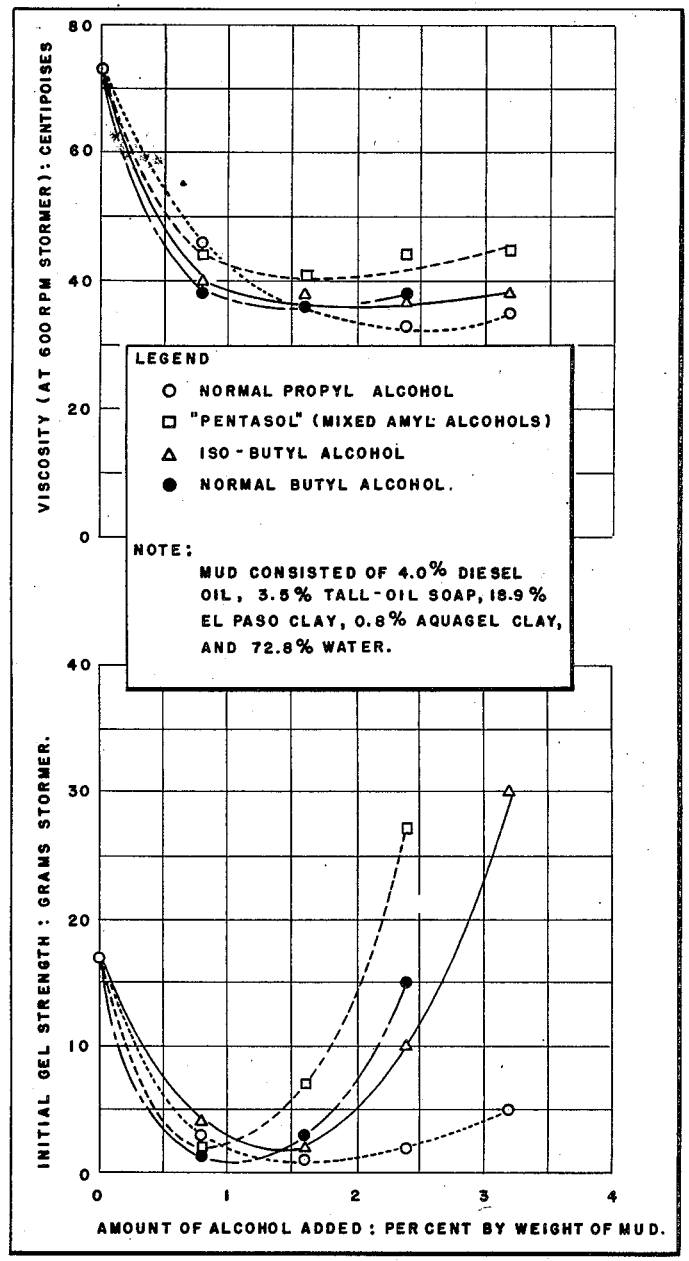

Dec. 21, 1954   R. A. SALATHIEL   2,697,692
EMULSION MUD
Filed Sept. 24, 1949   3 Sheets-Sheet 1

INVENTOR.
Richard A. Salathiel,
BY
ATTORNEY.

INVENTOR.
Richard A. Salathiel,

Dec. 21, 1954   R. A. SALATHIEL   2,697,692
EMULSION MUD

Filed Sept. 24, 1949   3 Sheets-Sheet 3

INVENTOR.
Richard A. Salathiel,
BY
Melvin F. Fincke
ATTORNEY.

United States Patent Office 2,697,692
Patented Dec. 21, 1954

2,697,692

EMULSION MUD

Richard A. Salathiel, Houston, Tex., assignor, by mesne assignments, to Standard Oil Development Company, Elizabeth, N. J., a corporation of Delaware Application September 24, 1949, Serial No. 117,560

7 Claims. (Cl. 252—8.5)

This invention relates to a drilling fluid and to a method for controlling the viscosity and filtration rate thereof. More particularly, this invention relates to an oil-in-water emulsion mud having a low filtration rate and viscosity and to a method of preparing such a mud.

In the art of drilling boreholes into subsurface formations by the rotary drilling method, it is common practice to employ a drilling fluid. Both aqueous and non-aqueous, or oil-base drilling fluids, have been used for this purpose. The aqueous drilling fluids usually comprise water, colloidal material of both gel-forming and non-gel-forming types, and weighting materials suspended in the water. The non aqueous, or oil-base drilling fluids, normally consist of a non-aqueous liquid such as crude oil or a petroleum distillate, and a weighting material which is preferably oil wettable. While aqueous-base fluids are more widely used than oil-base fluids, these fluids often possess a marked tendency to lose water to the formation being drilled through and, accordingly, are detrimental in some of these formations. Consequently, where it is desirable not to subject the formation being drilled to the action of large quantities of water, drilling fluids having little tendency to lose water are employed. It is in situations where even moderate amounts of water are objectionable that oil-base muds find their widest application.

In addition to aqueous drilling fluids and non-aqueous drilling fluids, the use of emulsion-type muds is also known. Emulsion muds consist of a substantially water-insoluble liquid, such as oil, a weighting material, such as clay, and water, together with a suitable suspending or dispersing agent. The mixture of these components forms a water-in-oil emulsion or an oil-in-water emulsion, depending on the character of the water-insoluble liquid, upon the proportion in which it is present relative to the water, and upon the character of the suspending or dispersing agent.

According to the present invention, the viscosity and filtration rate of an aqueous-base drilling fluid is controlled by adding to the aqueous-base drilling fluid a hydrocarbon oil, a suspending or dispersing agent, and an alcohol, these materials being added to the aqueous-base drilling fluid in such a quantity as to form an oil-in-water emulsion of desirable properties. This oil-in-water emulsion has a low filtration rate and a low viscosity. Thus, the aforementioned oil-in-water emulsion comprises finely divided solid inorganic material such as hydratable clay with or without a weighting agent, water, a hydrocarbon oil, a water-soluble soap of a fatty acid or of a rosin acid, and an aliphatic alcohol.

Any aliphatic alcohol may be employed which contains at least three carbon atoms but not more than six carbon atoms per molecule, the maximum length of any carbon chain attached to the carbinol group being not more than four carbon atoms; i. e., no carbon atom in the molecule is to be further removed from the carbinol group than the fourth position. Within these limitations, the aliphatic alcohol may be primary, secondary, or tertiary, and the carbon chain or chains attached to the carbinol group may be normal or branched. Examples of such alcohols include: normal propanol; iso propanol; normal butanol, 1 methyl propanol; 2 methyl propanol; 1,1,1 trimethyl methanol; 1 methyl butanol; 2 methyl butanol, 3 methyl butanol; 1,1 dimethyl propanol; 2,2 dimethyl propanol; 1,2 dimethyl butanol; 1,3 dimethyl butanol; 1 ethyl butanol; 1,1 methyl ethyl propanol; 2 ethyl butanol; and 2 methyl pentanol. Of course, mixtures of any two or more of these alcohols may be employed.

The hydrocarbon oil may consist of crude oil, diesel fuel oil, kerosene, gas oil, or the like, or mixtures thereof. Preferably, a gas oil fraction or diesel fuel oil is employed.

The dispersing or suspending agent employed in the composition of my invention consists of an alkali-metal soap of the higher fatty acids having at least 16 carbon atoms and not more than 19 carbon atoms in the molecule, or of an alkali metal soap of a rosin acid, such as pimaric, sapinic, or abietic acid. Examples of the aforementioned higher fatty acids include palmitic acid, margaric acid, stearic acid, nondecylic acid, oleic acid, linoleic acid, ricinaleic acid, etc. It will be understood, of course, that the aforementioned salts may be employed singly or in admixture with each other and may be employed in the impure as well as in the relatively pure form. For example, a satisfactory suspending or dispersing agent may be prepared containing salts of the aforementioned acids by neutralizing tall oil with an alkali metal hydroxide. As is well known, tall oil consists mainly of rosin acids and fatty acids, and is obtained as a by-product from sulfate pine woodpulp digestion.

The aforementioned hydrocarbon oil, alkali metal soap, and alcohol may each be added individually to the aqueous base drilling fluid, or they may be first admixed to form a homogeneous solution and the homogeneous solution then added to the aqueous base drilling fluid to form the oil-in-water emulsion mud. Irrespective of the manner in which these ingredients are added to the aqueous-base drilling fluid, the alcohol is employed in an amount in the range of 0.5% and 3.0% by weight of the final oil-in-water emulsion mud. The amount of alcohol to be used in any particular case will depend upon the specific alcohol or alcohols used, the amount of alkali metal soap present, and the amount of hydrocarbon oil employed. Although I prefer to employ an alcohol in an amount in the range of 1.0% to about 2.0%, it will be understood that a sufficient quantity of an alcohol is incorporated in the final emulsion mud to obtain a mud having a low filtration rate and a low viscosity.

The amount of alkali metal soap of a fatty acid or a rosin acid employed in accordance with my invention will depend upon the kind and amount of alcohol used, the nature and amount of the hydrocarbon oil present, the density of the mud, and the filtration rate desired for the resulting oil-in-water emulsion mud. Ordinarily, the amount of alkali metal soap employed will range from a minimum of about 1.5% to a maximum of about 7.0% by weight of the final oil-in-water emulsion mud.

The amount of hydrocarbon oil employed will depend upon the amount of soap employed, the amount and kind of alcohol employed, the density of the mud, and the characteristics of the hydrocarbon oil itself, and will be in the range between about 2% and 35% by weight of the final oil-in-water emulsion mud. Ordinarily, the amount of hydrocarbon oil employed will be in the range from about 4.0% to about 12% by weight of the final mixture.

Although the oil-in-water emulsion mud may be formed by adding the separate materials to the aqueous drilling fluid, as hereinbefore pointed out, a homogeneous solution of the alkali metal soap in the hydrocarbon oil and the alcohol offers many advantages from the standpoint of field use, and I prefer to employ such a homogeneous solution. A homogeneous solution may be formed by agitating the hydrocarbon oil, the soap, and the alcohol together with a small amount of water, the water being present in the homogeneous solution in an amount of about 5% by weight. One example of such a solution consisted of 15% by weight of sodium oleate, 14% isopropyl alcohol, 66% gas oil, and 5% water. By employing such a homogeneous solution in the field of use, the necessity for transporting and measuring the required quantities of separate ingredients and then incorporating these separate ingredients into the aqueous-base drilling fluid is eliminated.

The following specific examples are included herein to illustrate my invention and not to define the limitations thereof.

In order to determine the effect of adding different aliphatic alcohols on the viscosity and filtration rate of an oil-in-water emulsion mud, different alcohols were added to different samples of an emulsion mud which consisted of 19.6% of a surface clay mined in Texas (El Paso clay), 0.8% of a bentonitic clay (Aquagel), 6% Diesel fuel oil, 3.2% of tall oil soap made by neutralizing tall oil with sodium hydroxide, and 70.4% by weight of tap water. The viscosity of the mud without any alcohol added thereto varied from 230 to 320 centipoises between the initial and final tests. The data obtained are shown in Table I below:

*Table I*

| Material Added in 1% Conc. | Viscosity Reduction,[1] percent | Filtration Rate: cc. in 30 Min. API |
|---|---|---|
| None | | 4.7 |
| Methyl Alcohol | 17 | 4.1 |
| Ethyl Alcohol | 32 | 4.5 |
| Isopropyl Alcohol | 53 | 3.7 |
| Normal Propyl Alcohol | 64 | 3.5 |
| Isobutyl Alcohol | 73 | 3.4 |
| Normal Butyl Alcohol | 72 | 3.2 |
| Tertiary Amyl Alcohol | 76 | 3.4 |
| 1,2 Dimethyl Butyl Alcohol | 71 | 3.8 |
| 2 Ethyl Butyl Alcohol | 50 | 4.3 |
| Normal Hexyl Alcohol | −8 | |
| Normal Heptyl Alcohol | −17 | |

[1] Based on stock mud viscosity, which varied from 230 to 320 centipoises between the initial and final tests.

It will be noted from the foregoing table that methyl alcohol and ethyl alcohol did not appreciably reduce the filtration rate or the viscosity of the emulsion mud. On the other hand, isopropyl alcohol, 2 ethyl butyl alcohol, normal propyl alcohol, isobutyl alcohol, normal butyl alcohol, tertiary amyl alcohol, and 1,2 dimethyl butyl alcohol reduced the filtration rate to a lower figure while markedly reducing the viscosity of the emulsion mud. It will be further noted that normal hexyl alcohol and normal heptyl alcohol not only did not decrease the viscosity of the emulsion mud but actually increased the viscosity. These data, therefore, show methyl alcohol, ethyl alcohol, normal hexyl alcohol, and normal heptyl alcohol to be ineffective or not practically effective from the standpoint of filtration rate and/or viscosity reduction.

Figure 2:
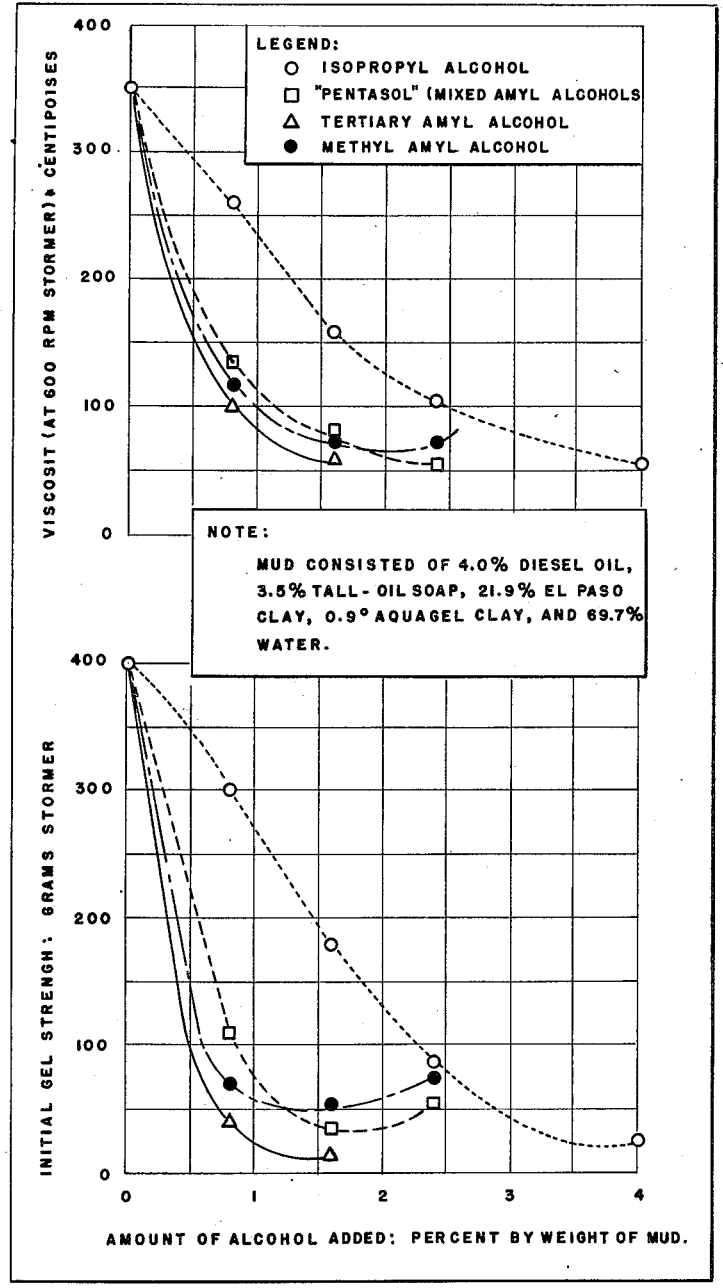

In order to determine the effect of change in concentration of alcohols on the initial gel strength and on the viscosity of emulsion muds, varying amounts of certain alcohols were added to samples of two different emulsion muds and the viscosity and gel strength determined. The data obtained in this series of tests are shown in Figs. 1 and 2. The data plotted in Fig. 1 were obtained when using an emulsion mud having a viscosity of about 73 centipoises and an initial gel strength of about 17 grams Stormer. This mud consisted of 4.0% Diesel fuel oil, 3.5% tall oil soap made by neutralizing tall oil with sodium hydroxide, 18.9% of a surface clay mined in Texas (El Paso clay), 0.8% of a bentonitic clay (Aquagel), and 72.8% water. The data plotted in Fig. 2 were obtained when using an emulsion mud having a viscosity of about 350 centipoises and an initial gel strength of about 400 grams Stormer. This emulsion mud consisted of 4.0% diesel fuel oil, 3.5% tall oil soap made by neutralizing tall oil with sodium hydroxide, 21.9% of a surface clay mined in Texas (El Paso clay), 0.9% of a bentonitic clay (Aquagel), and 69.7% water.

Reference to Fig. 1 shows that normal propyl alcohol, normal butyl alcohol, isobutyl alcohol, and the mixture of isomeric amyl alcohols substantially reduced the viscosity of the mud to which they were added, and that this reduction was accomplished with less than about 1% of the alcohol and reached its maximum when between 1 and 3% was added. It will be further noted that the gel strength of this mud was reduced to a minimum with the addition of from about 1% to about 2% of alcohol. Reference to Fig. 2 again shows that isopropyl alcohol, tertiary amyl alcohol, methyl amyl alcohol, and mixed isomeric amyl alcohols were effective in reducing the viscosity of the mud to which they were added, isopropyl alcohol being the least effective in this respect. These alcohols also reduced the gel strength, isopropyl alcohol again being the least effective. Fig. 2 further shows that maximum effectiveness in viscosity reduction is secured when the alcohol is added to the emulsion mud in concentrations ranging between about 0.5% and 3.0%.

Figure 3:
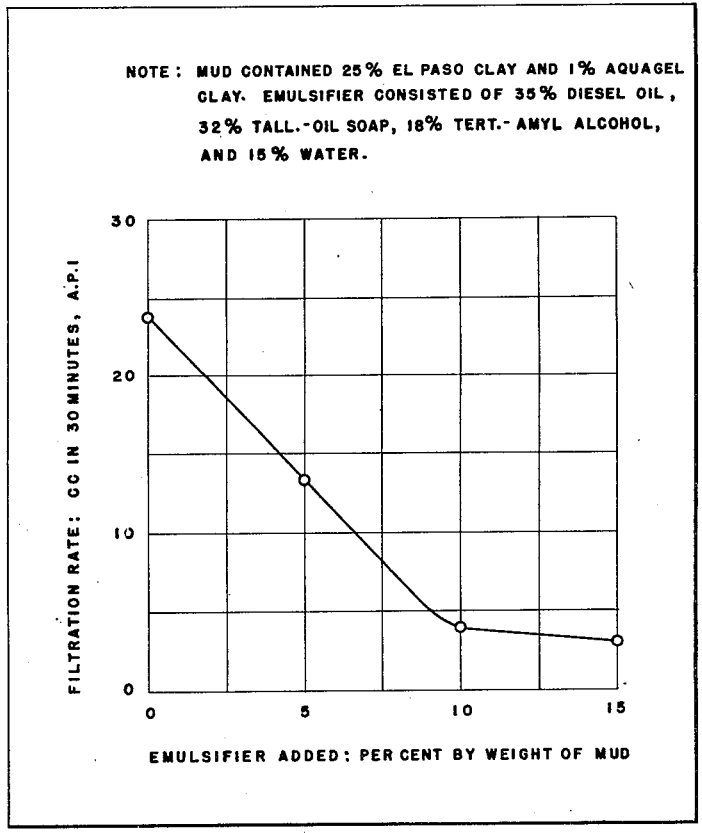

In another series tertiary amyl alcohol was included in an emulsifier mixture consisting of 35% diesel fuel oil, 32% of tall oil soap made by neutralizing tall oil with sodium hydroxide, 18% of tertiary amyl alcohol, and 15% water. This solution was homogeneous. The homogeneous emulsifier solution was added in concentrations ranging up to 15 weight per cent to different samples of an aqueous base mud consisting of 25% of a surface clay mined in Texas (El Paso clay), 1% of a bentonitic clay (Aquagel), and 74% tap water. The filtration rate of each of these samples was then determined by the standard A. P. I. method. The data obtained in this series of tests are shown in Fig. 3. Reference to Fig. 3 shows that by incorporating from 10 to 15 weight per cent of the emulsifier solution into the aqueous-base drilling fluid, an oil-in-water emulsion mud is obtained which has a filtration rate of less than four cubic centimeters. It should be noted that when 10 to 15 weight per cent of emulsifier solution is employed, the resulting oil-in-water emulsion mud contains alcohol in an amount ranging from about 1.8% to about 2.7% by weight.

In still another series of tests, an emulsifier solution was formed which consisted of 15% sodium oleate, 14% isopropyl alcohol, 5% water, and 66% gas oil having a gravity of 35.1° A. P. I. and an initial, 50% and 95% boiling point of 416° F., 530° F., and 634° F., respectively. This solution was admixed with an aqueous-base drilling fluid consisting of 1.9% of a commercial Wyoming bentonite clay (Aquagel), 21.8% of a surface clay mined in Texas (El Paso clay), and 76.3% water, the said solution being present in the final admixture in a concentration of 25 weight percent. The filtration rate of this admixture as well as that of the aqueous drilling fluid was determined. The filtration rate of the aqueous drilling fluid to which straight gas oil was added was also determined for comparison. The data obtained are presented below in Table II:

*Table II*

| Composition Tested in 25% Conc. in Mud | API Filtration Rate: cc. in 30 Min. |
|---|---|
| None (Blank) | 27 |
| Straight Gas Oil | 15.4 |
| My Improved Oil-Base Fluid | 2.9 |

These data show that oil-in-water emulsion mud formed in the above described manner possesses an exceedingly low filtration rate as compared to the aqueous drilling fluid from which it was made.

Having fully described the present invention, what is claimed as new and useful and is desired to secure by Letters Patent is:

1. An oil-in-water emulsion drilling fluid comprising about 2.0 to 35% by weight of a hydrocarbon oil, 1.5% to 7.0% by weight of an alkali metal soap of a carboxylic acid selected from the group consisting of a rosin acid and a fatty acid having at least 16 carbon atoms but not more than 19 carbon atoms per molecule, 0.5% to 3.0% by weight of an aliphatic alcohol having at least 3 carbon atoms and not more than 6 carbon atoms per molecule, the maximum length of any carbon chain attached to the carbinol group of said alcohol being not more than 4 carbon atoms, and 95.5 weight per cent to 50.0 weight per cent of an aqueous suspension of finely divided solid inorganic material.

2. An oil-in-water emulsion drilling fluid in accordance with claim 1 in which the alkali metal soap of a carboxylic acid is the alkali metal soap of tall oil.

3. An oil-in-water emulsion drilling fluid in accordance with claim 1 in which the hydrocarbon oil is a gas oil.

4. An oil-in-water emulsion drilling fluid in accordance with claim 1 in which the aliphatic alcohol is isopropyl alcohol.

5. An oil-in-water emulsion drilling fluid in accordance with claim 1 in which the aliphatic alcohol is isobutyl alcohol.

6. An oil-in-water emulsion drilling fluid in accordance with claim 1 in which the aliphatic alcohol is tertiary amyl alcohol.

7. A composition of matter adapted for addition to an aqueous-base drilling fluid for reducing the loss of water by filtration therefrom consisting of from 15 to 32% by weight of an alkali metal soap of a carboxylic acid selected from the group consisting of a rosin acid and a fatty acid having from 16 to 19 carbon atoms per molecule; from 14 to 18% by weight of an aliphatic alcohol having at least 3 and no more than 6 carbon atoms per molecule, the maximum length of any carbon chain attached to the carbinol group of said alcohol being no more than 4 carbon atoms; from 5 to 15% by weight of water; and 66 to 35% by weight of a petroleum hydrocarbon oil.

References Cited in the file of this patent

UNITED STATES PATENTS

| Number | Name | Date |
| --- | --- | --- |
| 2,158,374 | Merrill | May 16, 1939 |
| 2,265,799 | Carlson | Dec. 9, 1941 |
| 2,380,156 | Dobson | July 10, 1945 |
| 2,391,087 | Donlan | Dec. 18, 1945 |
| 2,430,039 | Anderson | Nov. 4, 1947 |
| 2,476,845 | Dawson | July 19, 1949 |
| 2,488,304 | Malott | Nov. 15, 1949 |